(12) United States Patent
Feng et al.

(10) Patent No.: US 12,093,263 B1
(45) Date of Patent: Sep. 17, 2024

(54) RECOMMENDING JOIN OPERATIONS OF RELATIONAL DATA AMONG TABLES BASED ON OPTIMIZATION MODEL

(71) Applicant: International Business Machines Corporation, Armonk, NY (US)

(72) Inventors: Yuan Feng, Beijing (CN); Ling Zhuo, Beijing (CN); Qi Min, Beijing (CN); Pei Pei Liang, Beijing (CN); Yue Yang, Beijing (CN); Jun Wang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/123,473

(22) Filed: Mar. 20, 2023

(51) Int. Cl.
   *G06F 16/2455* (2019.01)
   *G06F 11/34* (2006.01)
   *G06F 16/242* (2019.01)
   *G06F 16/2453* (2019.01)

(52) U.S. Cl.
   CPC ...... *G06F 16/2456* (2019.01); *G06F 11/3409* (2013.01); *G06F 16/2423* (2019.01); *G06F 16/2453* (2019.01)

(58) Field of Classification Search
   CPC ............ G06F 16/2456; G06F 16/2423; G06F 16/2453
   See application file for complete search history.

(56) References Cited

U.S. PATENT DOCUMENTS

| | | | |
|---|---|---|---|
| 7,716,167 B2 | 5/2010 | Colossi et al. | |
| 10,565,222 B2 * | 2/2020 | Murray | G06F 16/2456 |
| 10,650,000 B2 | 5/2020 | Oberbreckling et al. | |
| 10,942,947 B2 * | 3/2021 | Colgrove | G06F 16/284 |
| 11,625,398 B1 * | 4/2023 | Bhuyan | G06F 16/24544 707/714 |
| 2017/0004158 A1 * | 1/2017 | Faerber | G06F 16/24553 |

(Continued)

FOREIGN PATENT DOCUMENTS

CN 113505141 A 10/2021

OTHER PUBLICATIONS

Gunjal et al., "An Intelligent System for Relational Databases," International Journal of Science and Research, vol. 6, No. 3, Mar. 2017, pp. 1546-1550.

*Primary Examiner* — Dangelino N Gortayo
(74) *Attorney, Agent, or Firm* — Shackelford, Mckinley & Norton, LLP; Robert A. Voigt, Jr.

(57) ABSTRACT

A computer-implemented method, system and computer program product for recommending join operations of relational data among different tables. Relationships between one or more pairs of columns of relational data for one or more pairs of tables are identified by determining the semantic similarity between each pair of columns of relational data. The data content join converge for each of the identified relationships in connection with joining the tables involved in such identified relationships is determined. Furthermore, a join strength (indication of the degree that the relational data in the paired columns match) is calculated for each of the identified relationships based on the semantic similarity and the data content join coverage for such identified relationships. Based on the calculated join strength as well as other factors, a combination optimization algorithm identifies the best join combinations of relational data of the tables among a set of tables.

20 Claims, 8 Drawing Sheets

(56) References Cited

U.S. PATENT DOCUMENTS

| | | | |
|---|---|---|---|
| 2019/0384863 A1* | 12/2019 | Sirin | G06V 10/776 |
| 2021/0149896 A1* | 5/2021 | Yu | G06F 18/22 |
| 2021/0334281 A1 | 10/2021 | Tabb et al. | |
| 2023/0112250 A1* | 4/2023 | Agrawal | G06F 16/24537 707/714 |

* cited by examiner

RECOMMENDING JOIN OPERATIONS OF RELATIONAL DATA AMONG TABLES BASED ON OPTIMIZATION MODEL

TECHNICAL FIELD

The present disclosure relates generally to relational datasets in a data lakehouse, and more particularly to recommending join operations of relational data among tables based on an optimization model.

BACKGROUND

A data lakehouse is a modern data platform built from a combination of a data lake and a data warehouse. More specifically, a data lakehouse takes the flexible storage of unstructured data from a data lake and the management features and tools from data warehouses, then strategically implements them together as a larger system.

SUMMARY

In one embodiment of the present disclosure, a computer-implemented method for recommending join operations of relational data among different tables comprises identifying relationships between one or more pairs of columns of relational data for one or more pairs of tables by determining a semantic similarity between each pair of columns of relational data for a pair of tables for each unique combination of a pair of tables of a set of tables of relational data. The method further comprises determining data content join coverage for each of the identified relationships, where the data content join coverage indicates a degree of uniqueness among the pair of columns of relational data. The method additionally comprises calculating a join strength for each of the identified relationships based on the semantic similarity and the data content join coverage, where the join strength is an indication of a degree that relational data in the identified relationship matches in terms of semantics and coverage. Furthermore, the method comprises generating a score for each join combination of relational data of tables of the set of tables according to an objective with weighted factors, where the weighted factors comprise the join strength for each of the identified relationships. Additionally, the method comprises generating a list of recommended join combinations of relational data of tables of the set of tables based on the scores.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
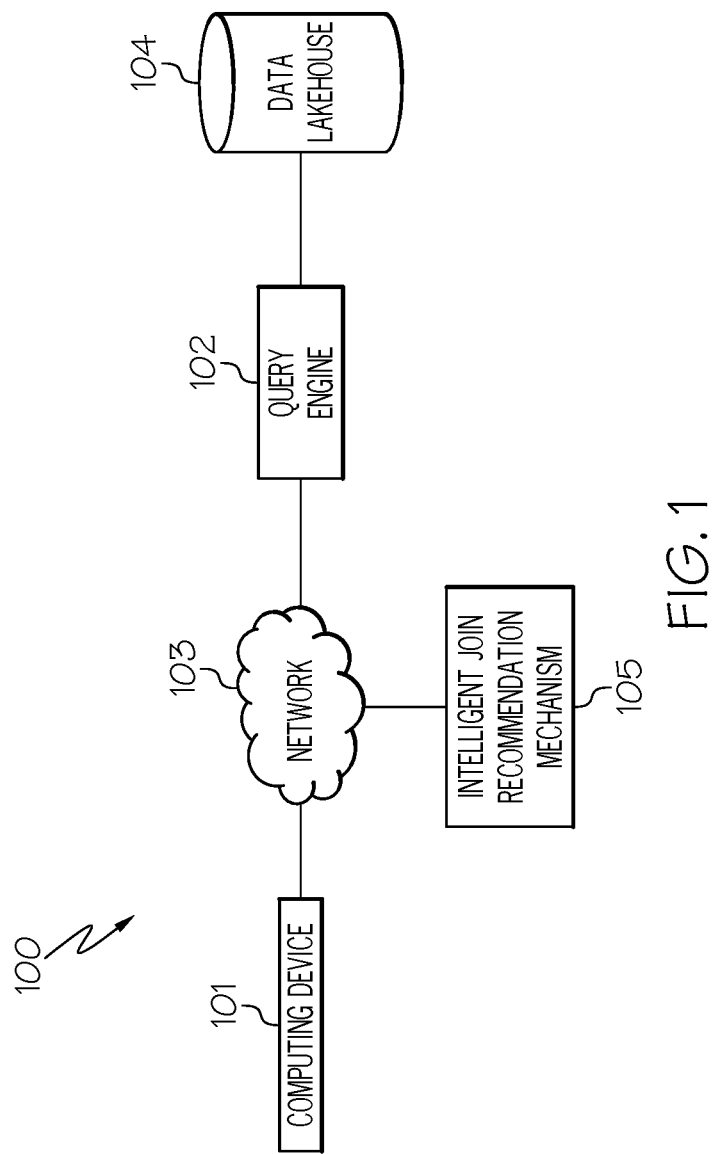
FIG. 1 illustrates a communication system for practicing the principles of the present disclosure in accordance with an embodiment of the present disclosure.

As stated in the Background section, a data lakehouse is a modern data platform built from a combination of a data lake and a data warehouse. More specifically, a data lakehouse takes the flexible storage of unstructured data from a data lake and the management features and tools from data warehouses, then strategically implements them together as a larger system.

A data lake is a low-cost storage repository primarily used by data scientists, but also by business analysts, product managers and other types of end users. Unstructured raw data from various organizational sources goes into the lake, often for staging prior to loading into a data warehouse and building datasets.

A data warehouse is a different type of storage repository from a data lake in that a data warehouse stores processed and structured data, curated for a specific purpose, and stored in a specified format. This data is typically queried by business users who use the prepared data in analytics tools for reporting and projections. A data warehouse typically includes data management features, such as data cleansing and extract/load/transform (ETL).

A data lakehouse is a data platform built from the combination of a data lake and a data warehouse in which data can be easily moved between the low-cost and flexible storage of a data lake over to a data warehouse and vice-versa, providing easy access to a data warehouse's management tools for implementing schema and governance, often powered by machine learning and artificial intelligence for data cleansing. The result creates a data repository that integrates the affordable, unstructured collection of data lakes and the robust preparedness of a data warehouse.

A data lakehouse extracts and joins data from various data sources in various formats, such as relational database management system (RDBMS), CSV (comma-separated values), Apache® Parquet, JSON (JavaScript Object Notation), etc. Data lakehouse technology converts such data into tables and columns at a conceptual level so that the user can leverage SQL (Structured Query Language) for querying and extracting data, such as relational data (also referred to as "relational datasets"). Relational data refers to data within the tables that have relationships with one another or dependencies.

At times, the relational datasets from such tables need to be joined in a wide table for further analysis. It is a challenge though to identify the most appropriate sub-datasets from the huge and various relational datasets to be joined for further analysis due to the complexity in determining which sub-datasets contain relationships that need to be analyzed, especially when such datasets are in various formats (e.g., CSV, Apache® Parquet, JSON, etc.).

Unfortunately, there is not currently a means for effectively identifying the most appropriate sub-datasets from the huge and various relational datasets to be joined for further analysis.

The embodiments of the present disclosure provide a means for exploring insights from a given set of relational data based on different combinations of sub-datasets. Such insights are explored based on calculating a "join strength." A "join strength," as used herein, refers to an indication of a degree that the relational data in the sub-datasets (e.g., columns of a pair of tables) match in terms of semantics and coverage. In particular, the join strength is based on semantic similarity and data content join coverage for the sub-datasets. "Semantic similarity," as used herein, refers to the closeness in meaning or semantic content in the sub-datasets (e.g., columns of a pair of tables). "Data content join coverage," as used herein, refers to the degree of uniqueness among the pair of sub-datasets (e.g., pair of columns of a pair of tables) of the relational data. Based on the calculated join strength as well as other factors, a combination optimization algorithm identifies the best join combinations of relational data (sub-datasets) of the tables among a set of tables. The combination optimization algorithm generates a score for each proposed join combination of relational data (sub-datasets) of the tables among a set of tables according to an objective with weighted factors, such as the calculated join strength. A list of recommended join combinations of relational data of the tables among the set of tables is then generated based on the scores in terms of SQL statements with join clauses. User feedback based on the user's selection of SQL statements may be used to adjust the object weights to improve the accuracy of the combination optimization algorithm. In this manner, a more effective means for identifying the most appropriate sub-datasets to be joined for further analysis is achieved. These and other features will be discussed in further detail below.

In some embodiments of the present disclosure, the present disclosure comprises a computer-implemented method, system and computer program product for recommending join operations of relational data among different tables. In one embodiment of the present disclosure, relationships between one or more pairs of columns of relational data for one or more pairs of tables are identified by determining the semantic similarity between each pair of columns for each unique combination of tables among the list of tables received from the user. An "identified relationship," as used herein, corresponds to a pair of columns of relational data with a semantic similarity that exceeds a threshold level. The "semantic similarity," as used herein, refers to how similar in meaning is the content of the relational data contained in such pairs of columns. Furthermore, the data content join converge for each of the identified relationships in connection with joining the tables involved in such identified relationships is determined. The "data content join coverage," as used herein, indicates a degree of uniqueness among the pair of columns of the relational data. A join strength is calculated for each of the identified relationships based on the semantic similarity and the data content join coverage for such identified relationships. A "join strength," as used herein, refers to an indication of the degree that the relational data in the identified relationship match in terms of semantics and coverage. Based on the calculated join strength as well as other factors, a combination optimization algorithm identifies the best join combinations of relational data of the tables among a set of tables. The combination optimization algorithm generates a score for each proposed join combination of relational data (sub-datasets) of the tables among a set of tables according to an objective with weighted factors, such as the calculated join strength. A list of recommended join combinations of relational data of the tables among the set of tables is then generated based on the scores in terms of SQL statements with join clauses. User feedback based on the user's selection of SQL statements may be used to adjust the object weights to improve the accuracy of the combination optimization algorithm. In this manner, a more effective means for identifying the most appropriate relational data of the tables to be joined for further analysis is achieved.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill the relevant art.

Referring now to the Figures in detail, FIG. 1 illustrates an embodiment of the present disclosure of a communication system 100 for practicing the principles of the present disclosure. Communication system 100 includes a computing device 101 connected to a query engine 102 (e.g., structured query language (SQL) server) via a network 103. Furthermore, as illustrated in FIG. 1, query engine 102 is connected to a data lakehouse 104.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and query engine 102. It is noted that both computing device 101 and the user of computing device 101 may be identified with element number 101.

Network 103 may be, for example, a local area network, a wide area network, a wireless wide area network, a circuit-switched telephone network, a Global System for Mobile communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In one embodiment, the user of computing device 101 issues a query (e.g., SQL query) to query engine 102 (e.g., SQL server) to join tables of data lakehouse 104, such as via the SQL join clause. Data lakehouse 104, as used herein, refers to a data platform built from a combination of a data lake and a data warehouse. More specifically, data lakehouse 104 takes the flexible storage of unstructured data from a data lake and the management features and tools from data warehouses, then strategically implements them together as a larger system. Query engine 102, as used herein, is configured to execute queries against data in data lakehouse 104 and provide answers for users, such as the user of computing device 101. Examples of query engine 102 include, but not limited to, MySQL®, IBM® Db2®, Microsoft Access®, SQLite®, Apache® Hive™, etc.

In one embodiment, the relational data of the tables of data lakehouse 104 may be located at various locations as opposed to a single location. Furthermore, the relational data of the tables of data lakehouse 104 may be stored in various formats, such as CSV, Apache® Parquet, JSON (JavaScript Object Notation), etc. In one embodiment, such relational data in various tables of data lakehouse 104 may be joined together based on recommended join combinations issued by intelligent join recommendation mechanism 105 as discussed below. In one embodiment, such recommendations may be in the form of SQL statements with join clauses which are selected and issued by the user of computing device 101.

Furthermore, as shown in FIG. 1, intelligent join recommendation mechanism 105 is connected to network 103. In one embodiment, intelligent join recommendation mechanism 105 is configure to generate recommended join operations of relational data among different tables of data lakehouse 104. In one embodiment, such recommendations are generated based on a combination optimization algorithm designed to identify the best join combinations of relational data among the tables of data lakehouse 104 according to the objective to find the best join combinations of relational data among the tables of data lakehouse 104 based on the weighted factors. In one embodiment, such weighted factors include the "join strength." A "join strength," as used herein, refers to an indication of the degree that the relational data among the tables of data lakehouse 104 match in terms of semantics and coverage. In particular, the join strength is based on semantic similarity and the data content join coverage for the sub-datasets. "Semantic similarity," as used herein, refers to the closeness in meaning or semantic content in the relational data among the tables of data lakehouse 104. "Data content join coverage," as used herein, indicates a degree of uniqueness among a pair of columns of the relational data among the tables of data lakehouse 104. Other weight factors include the count of joined tables (refers to the number of tables to be joined), the average of the join strength (refers to the average of the join strength among the pairs of columns of the tables to be joined), the joined record count (count of rows) as a percentage to the record count in the core table (core table defines the entities and relationships between them) and a percentage of proven relationships (percentage of identified relationships involving pairs of columns of the tables to be joined that can be joined using SQL statements previously generated by the combination optimization algorithm). Based on such factors, the weights of which may be user-selected, the combination optimization algorithm identifies the best join combinations of relational data among the tables of data lakehouse 104.

In one embodiment, the combination optimization algorithm generates a score for each proposed join combination of relational data among the tables of data lakehouse 104 according to the weighted factors discussed above. In one embodiment, intelligent join recommendation mechanism 105 generates a list of recommended join combinations of the relational data among the tables of data lakehouse 104 based on such scores in terms of SQL statements with join clauses.

In one embodiment, intelligent join recommendation mechanism 105 receives user feedback based on the user's selection of SQL statements out of the recommended join combinations of the relational data. Based on the user's feedback, intelligent join recommendation mechanism 105 adjusts the object weights to improve the accuracy of the combination optimization algorithm. In this manner, a more effective means for identifying the most appropriate sub-datasets to be joined for further analysis is achieved. A more detailed description of these and other features will be provided below. Furthermore, a description of the software components of intelligent join recommendation mechanism 105 is provided below in connection with FIG. 2 and a description of the hardware configuration of intelligent join recommendation mechanism 105 is provided further below in connection with FIG. 5.

System 100 is not to be limited in scope to any one particular network architecture. System 100 may include any number of computing devices 101, query engines 102, networks 103, data lakehouses 104 and intelligent join recommendation mechanisms 105.

A discussion regarding the software components used by intelligent join recommendation mechanism 105 to provide recommended join operations of relational data among different tables is provided below in connection with FIG. 2.

Figure 2:
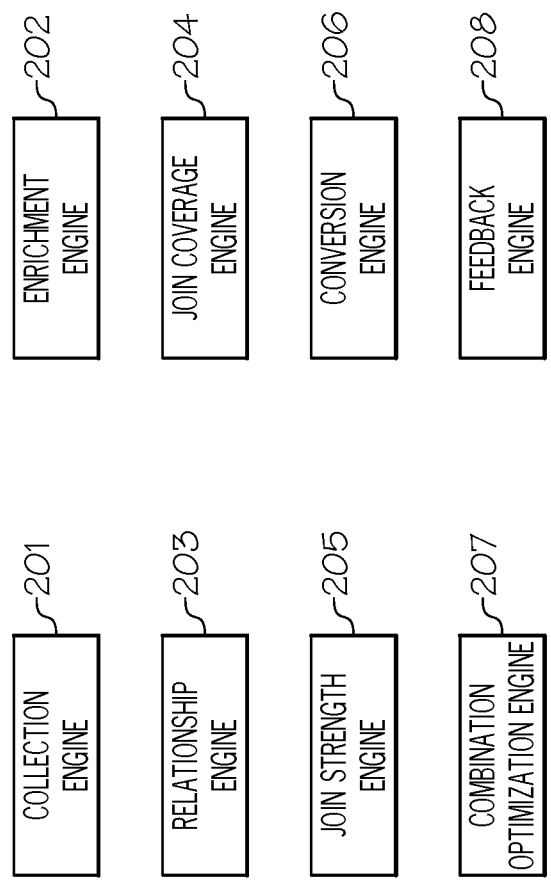
FIG. 2 is a diagram of the software components used by the intelligent join recommendation mechanism to provide recommended join operations of relational data among different tables in accordance with an embodiment of the present disclosure.

FIG. 2 is a diagram of the software components used by intelligent join recommendation mechanism 105 to provide recommended join operations of relational data among different tables in accordance with an embodiment of the present disclosure.

As shown in FIG. 2, intelligent join recommendation mechanism 105 includes a collection engine 201 configured to collect metadata and sample data from relational data of table datasets of data lakehouse 104.

In one embodiment, a user (e.g., user of computing device 101) selects a list of tables of datasets of relational data from data lakehouse 104, such as via a SQL editor. Such a selection is received by collection engine 201, such as via an application programming interface. In one embodiment, such a list of tables of datasets of relational data corresponds to the datasets to be intelligently joined by intelligent join recommendation mechanism 105.

Upon receiving such a selected list of tables of datasets of relational data, collection engine 201 collects the metadata and sample data from the relational data of the user-selected table datasets.

In one embodiment, since such table datasets may be stored in various formats (CSV, Apache® Parquet, etc.), collection engine 201 collects such metadata and sample data from various sources. In one embodiment, collection engine 201 collects such metadata and sample data by accessing the information schema system database of data lakehouse 104, which contains database metadata, such as the names of the tables, the column data types, the number of columns, privileges, etc. In one embodiment, collection engine 201 utilizes various software tools for accessing such metadata and sample data from the information schema, including, but not limited to, Navicat®, DbVisualizer, DataGrip®, DBeaver®, TablePlus®, etc.

In one embodiment, the metadata of the relational data of the table datasets is collected by collection engine 201 from a system catalog or data dictionary containing such metadata. In one embodiment, such metadata is accessed using SQL.

In one embodiment, collection engine 201 imports metadata (e.g., columns, views, synonyms, stored procedures, functions, etc.) from data lakehouse 104 concerning the relational data of the tables selected by the user using various software tools, including, but not limited to, IBM® Cognos®, CloverDX®, SAP® Bods, etc. In one embodiment, such particular metadata to be imported from data lakehouse 104 concerning the relational data of the tables selected by the user is determined by an expert.

In one embodiment, collection engine 201 selects various sample data (e.g., column data pertaining to addresses in the customer address table) of the relational data of the tables selected by the user. In one embodiment, such sample data is collected from data lakehouse 104 by collection engine 201 using various software tools, including, but not limited to, IBM® Cognos®, CloverDX®, SAP® Bods, etc. In one embodiment, such sample data to be collected by collection engine 201 is determined by an expert.

Furthermore, intelligent join recommendation mechanism 105 includes an enrichment engine 202 configured to enrich the collected metadata (table metadata). "Enriched metadata," as used herein, refers to metadata, such as the collected table metadata, which has been increased in quantity and quality with additional metadata. In one embodiment, such additional metadata is obtained from a dimension table(s) as well as the unique key or primary key for each table (each table selected by the user) if not previously defined.

A "dimension table," as used herein, refers to a table or entity in a star, snowflake or starflake schema that stores details about the facts. That is, the dimension table stores attributes or dimensions that describe the objects in a fact table. For example, a time dimension table stores the various aspects of time, such as year, quarter, month, day, etc. In one embodiment, enrichment engine 202 accesses such attributes or dimensions in the dimension table(s) in connection with the tables of datasets of relational data selected by the user using various software tools, including, but not limited to, Amazon® Redshift®, Microsoft® Azure®, PostgreSQL®, etc.

In one embodiment, for tables that were selected by the user that do not include a unique key or primary key definition, enrichment engine 202 generates such unique keys or primary keys. A "unique key," as used herein, refers to a candidate key that is not the primary key of the relation. All the candidate keys of a relation can uniquely identify the records of the relation, but only one of them is used as the "primary key" of the relation. The remaining candidate keys are called unique keys because they can uniquely identify a record in a relation. In one embodiment, unique keys can consist of multiple columns. In one embodiment, the unique keys have a "unique constraint" assigned to it in order to prevent duplicates (a duplicate entry is not valid in a unique column). In one embodiment, enrichment engine 202 creates unique keys for those tables that were selected by the user that do not include a unique key definition by defining the unique constraint(s). In one embodiment, such a unique constraint is defined by enrichment engine 202 by selecting a set of one or more fields/columns of a table that uniquely identify a record in the database table. In one embodiment, such unique constraints are created by enrichment engine 202 using various software tools, such as SQL Server Management Studio or Transact-SQL.

In one embodiment, concerning those tables that were selected by the user that do not include a unique key definition, there may be certain data formats (e.g., CSV, Apache® Parquet) that do not utilize a primary key definition. In such cases, enrichment engine 202 leverages information, such as column data and data type, in order to identify the primary key for such data formats. In one embodiment, such information may be utilized by enrichment engine 202 to generate the primary key using various software tools, such as SQL Server Management Studio or Transact-SQL.

Upon accessing the attributes or dimensions in the dimension table(s) and/or generating unique keys/primary keys, such additional metadata is used by enrichment engine 202 to enrich the collected table metadata in order to increase the collected table metadata in quantity and quality. In one embodiment, enrichment engine 202 enriches the collected table metadata with such additional metadata using various software tools, including, but not limited to, Alation®, InfoSphere®, Infogix®, Informatica®, etc.

Furthermore, as shown in FIG. 2, intelligent join recommendation mechanism 105 includes a relationship engine 203 configured to identify relationships between one or more pairs of columns for one or more pairs of tables by determining the semantic similarity between each pair of columns of relational data for a pair of tables for each unique combination of a pair of tables within the set of tables selected by the user. "Semantic similarity," as used herein, refers to how similar in meaning is the content of the relational data contained in such pairs of columns. In one embodiment, semantic similarity is determined by relationship engine 203 encoding the relational data contained in such pairs of columns and then calculating the cosine similarity of the resulting two embeddings.

In one embodiment, relationship engine 203 determines the semantic similarity between each pair of columns for a pair of tables for each unique combination of a pair of tables within the set of tables selected by the user using the Jaccard similarity coefficient (or index). For example, for two sets of column data, A and B, the Jaccard index is defined to be the ratio of the size of their intersection and the size of their union: $J(A,B)=(A \cap B)/(A \cup B)$.

In another embodiment, relationship engine 203 determines the semantic similarity between each pair of columns for a pair of tables for each unique combination of a pair of tables within the set of tables selected by the user using the MinHash scheme to estimate J(A,B) quickly without computing the intersection or union. In one embodiment, the following aggregate functions are utilized by relationship engine 203 for estimating the approximate similarity using MinHash: MINHASH (returns a MinHash state containing a MinHash array of length k (input argument), MINHASH COMBINE (combines two (or more) input MinHash states into a single output MinHash state) and APPROXIMATE SIMILARITY (returns an estimation of the similarity (Jaccard index) of input sets based on their MinHash states).

In one embodiment, the semantic similarity between each pair of columns for a pair of tables for each unique combination of a pair of tables within the set of tables selected by the user is determined using the following formula:

$$\text{WordSimilarity}(tbl1,col1,tbl2,col2,['name','description','business term','primarykey'])*\text{DatatypeSimilarity}(col1,col2)$$

where "tbl1" refers to a first table in the pair of tables and "tbl2" refers to the other table in the pair of tables, where "col1" refers to a first column in the pair of columns and "col2" refers to a second column in the pair of columns, where "name, description, business term and primary key" refer to the exemplary enriched metadata and where "DatatypeSimilarity" refers to the similarity in the type of data (description of the kind of data in a table column, such as integer, text, etc.). In one embodiment, the DatatypeSimilarity is computed for the columns, col1, col2, by relationship engine 203 extracting such information from the enriched metadata.

In one embodiment, relationship engine 203 generates a score as a result of calculating the semantic similarity between pairs of columns. In one embodiment the higher the score, the greater the semantic similarity between the pair of columns. In one embodiment, such a score is normalized between 0 and 1. In one embodiment, relationship engine 203 applies a natural language processing algorithm to calculate the semantic similarity which results in a score using word embedding techniques, such as Word2Vec and TF-IDF.

In one embodiment, when a score exceeds a threshold number, which may be user-designated, such a relationship is deemed to be an "identified relationship."

In one embodiment, relationship engine 203 classifies the identified relationships into 2 types, such as "parent-child," "child-parent" or "is-related-to." A "parent-child" or "child-parent" relationship refers to a one-to-one relationship between the pair of columns in which a column's data refers to another column's data in another table. For example, the parent column data may be directed to the data about a subject, such as employees and customers, and the child column data may be directed to the order. If the first column referenced in the identified relationship between the pair of columns is the child, then the relationship is identified as "child-parent." If the first column referenced in the identified relationship between the pair of columns is the parent, then the relationship is identified as "parent-child." A "is-related-to" relationship refers to a one-to many or a many-to-many relationship in which the data in one or more columns is linked to many records or data in other columns. For example, a column data may be directed to a camp counselor which is linked to the records of many campers.

In one embodiment, relationship engine 203 performs such classifications based on the calculated score of the semantic similarity between pairs of columns for the same pairs of tables. In one embodiment, a one-to-one relationship between the pair of columns may result in only a single unique semantic similarity score; whereas, a one-to many or many-to-many relationship between the pair of columns may result in many similar semantic similarity scores.

Intelligent join recommendation mechanism 105 additionally includes a join coverage engine 204 which determines the data content join converge for each of the identified relationships in connection with joining the tables involved in such identified relationships. The "data content join coverage," as used herein, indicates a degree of uniqueness among the pair of columns of the relational data of data lakehouse 104. In one embodiment, join coverage engine 204 determines such a data content join coverage based on the unique key count for the column in a pair of columns in the identified relationship versus the total unique key count for the joined tables. In one embodiment, such information (unique key count for the column and unique key count for the joined tables) is obtained from the enriched metadata.

In one embodiment, such data coverage corresponds to two values, where the first value is an indication of the coverage of the first column in the pair of columns of the first table with respect to the joined tables (first and second tables) and the second value is an indication of the coverage of the second column in the pair of columns of the second table with respect to the joined tables (first and second tables). For example, if column 1 of table 1 is being paired with column 2 of table 2, then the data coverage may correspond to two values, such as (0.9, 0.5), where the first value (0.9) indicates the coverage of column 1 of table 1 with respect to the joined tables (tables 1 and 2) and the second value (0.5) indicates the coverage of column 2 of table 2 with respect to the joined tables (tables 1 and 2). In one embodiment, in the example discussed above, the first value may correspond to the unique key count for column 1 of table 1 with respect to the unique key count for the joined tables, tables 1 and 2. The second value may correspond to the unique key count for column 2 of table 2 with respect to the unique key count for the joined tables, tables 1 and 2.

Furthermore, intelligent join recommendation mechanism 105 includes a join strength engine 205 configured to calculate the join strength for each of the identified relationships based on the semantic similarity and the data content join coverage for such identified relationship. A "join strength," as used herein, refers to an indication of the degree that the relational data in the identified relationship match in terms of semantics and coverage. In one embodiment, join strength engine 205 generates a value for the join strength, which may be normalized between 0 and 1. In one embodiment, the higher the value of the join strength, the better that the data in the columns in the pair of tables in the identified relationship match in terms of semantics and coverage and vice-versa. In one embodiment, join strength engine 205 calculates the join strength for each of the identified relationships based on the semantic similarity, the data content join coverage and the classified relationships. For example, the value of the join strength may be calculated using the following formula:

> Join Strength=0, if definition of semantic similarity<threshold or join data coverage=0;
>
> Min(0.8+
>   definition_semantic_similarity*Join_data_coverage,
>   1), if relation type is "Parent-child";
>
> Min(0.5+
>   definition_semantic_similarity*Join_data_coverage,
>   0.8), if relation type is "is-related-to";
>
> Min(0.5,
>   definition_semantic_similarity*Join_data_coverage),
>   otherwise.
>
> where "definition_semantic_similarity" refers to the value of the calculated semantic similarity for the identified classified relationship and "Join_data_coverage" refers to the value of the data content join coverage for the identified classified relationship.

An example of the calculated join strength and data content join coverage for the various identified relationships is discussed below in connection with FIG. 3.

Figure 3:
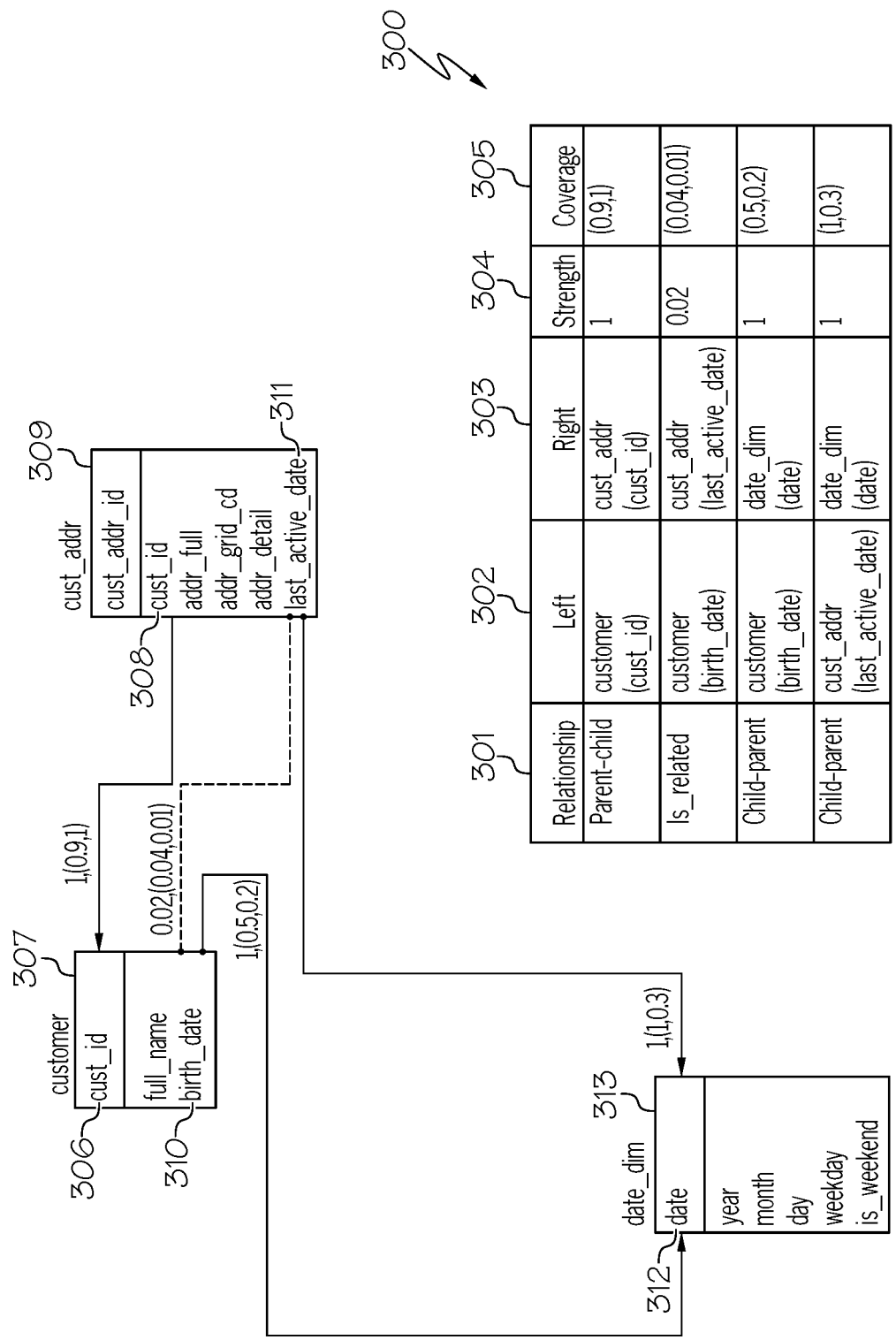
FIG. 3 illustrates the classification, the join strength and data content join coverage for each identified relationship between pairs of columns in pairs of tables within the set of tables selected by the user in accordance with an embodiment of the present disclosure.

FIG. 3 illustrates the classification, the join strength and data content join coverage for each identified relationship between pairs of columns in pairs of tables within the set of tables selected by the user in accordance with an embodiment of the present disclosure.

As shown in FIG. 3, there is a table 300 depicting the type of relationship (see column 301 of table 300) between a pair of columns in a pair of tables (identified as left 302 and right 303). Furthermore, table 300 includes the join strength 304 (identified as "strength") and the data content join coverage 305 (identified as "coverage") for each particular identified relationship. For example, one identified relationship is between the cust_id column 306 of the customer table 307 and the cust_id column 308 of the cust_addr table 309 which corresponds to having a join strength 304 of 1 and a data content join coverage 305 of (0.9, 1) as shown in table 300 of FIG. 3. Furthermore, such an identified relationship is classified as "parent-child" as shown in column 301 of table 300 of FIG. 3.

Furthermore, as shown in FIG. 3, another identified relationship is between the birth_date column 310 of the customer table 307 and the last_active_date column 311 of the cust_addr table 309 which corresponds to having a join strength 304 of 0.02 and a data content join coverage 305 of (0.04, 0.01) as shown in table 300 of FIG. 3. Furthermore, such an identified relationship is classified as "is-related" as shown in column 301 of table 300 of FIG. 3.

As further shown in FIG. 3, another identified relationship is between the birth_date column 310 of the customer table 307 and the date column 312 of the date_dim table 313 which corresponds to having a join strength 304 of 1 and a data content join coverage 305 of (0.5, 0.2) as shown in table 300 of FIG. 3. Furthermore, such an identified relationship is classified as "child-parent" as shown in column 301 of table 300 of FIG. 3.

Additionally, as shown in FIG. 3, a further identified relationship is between the last_active_date column 311 of the cust_addr table 309 and the date column 312 of the date_dim table 313 which corresponds to having a join strength 304 of 1 and a data content join coverage 305 of (1, 0.3) as shown in table 300 of FIG. 3. Furthermore, such an identified relationship is classified as "child-parent" as shown in column 301 of table 300 of FIG. 3.

Upon calculating the join strength for the classified relationships between the pairs of columns of tables to be joined within the set of tables selected by the user, a combination optimization algorithm identifies the best join combinations of relational data (sub-datasets) among the tables of data lakehouse 104 as discussed below.

Intelligent join recommendation mechanism 105 additionally includes a conversion engine 206 configured to convert the identified relationships to a star or snowflake schema by adding virtual tables. A "star schema," as used herein, is a multi-dimensional data model used to organize data in a database so that it is easy to understand and analyze. A "snowflake schema," as used herein, refers to a multi-dimensional data model that is an extension of a star schema where dimension tables are broken down into sub-dimensions. Such schemas are utilized for the logical arrangement of tables in a multidimensional database. The snowflake schema is represented by centralized fact tables which are connected to multiple dimensions. In one embodiment, such fact tables correspond to the virtual tables which are converted from the identified relationships. "Snowflaking" is a method of normalizing the dimension tables in a star schema. When it is completely normalized along all the dimension tables, the resultant structure resembles a snowflake with the fact table in the middle. The principle behind snowflaking is normalization of the dimension tables by removing low cardinality attributes and forming separate tables.

The snowflake schema is similar to the star schema. However, in the snowflake schema, dimensions are normalized into multiple related tables, whereas, the star schema's dimensions are denormalized with each dimension represented by a single table. In one embodiment, such single tables correspond to the virtual tables which are converted from the identified relationships. A complex snowflake shape emerges when the dimensions of a snowflake schema are elaborate, having multiple levels of relationships, and the child tables have multiple parent tables ("forks in the road").

In one embodiment, such virtual tables are created by conversion engine 206 from the information (e.g., join strength 304, data content join coverage 305, classified relationship 301) in table 300 pertaining to the identified relationships via the use of a SQL statement. In one embodiment, conversion engine 206 creates such virtual tables using a SQL console via the CREATE VIRTUAL TABLE statement using SAP®.

Furthermore, intelligent join recommendation mechanism 105 includes a combination optimization engine 207 configured to design a combination optimization algorithm to identify the best join combinations of relational data among the user-selected tables of data lakehouse 104 according to an objective with weighted factors. In one embodiment, the combination optimization algorithm generates a score for each proposed join combination of relational data (sub-datasets) of the user-selected tables of data lakehouse 104 according to an objective with weighted factors, such as the calculated join strength.

In one embodiment, combination optimization engine 207 designs such a combination optimization algorithm by converting the enriched table metadata and join relationship metadata into a vector matrix. A "vector matrix," as used herein, refers to a matrix that has only one row or only one column. "Join relationship metadata," as used herein, refers to the metadata pertaining to the identified relationships, such as the table name, column names, primary keys, etc. In one embodiment, such metadata is obtained by collection engine 201 by accessing the information schema system database of data lakehouse 104, which contains database metadata, such as the names of the tables, the column data types, the number of columns, privileges, etc. In one embodiment, collection engine 201 utilizes various software tools for accessing such metadata from the information schema, including, but not limited to, Navicat®, DbVisualizer, DataGrip®, DBeaver®, TablePlus®, etc.

In one embodiment, the metadata of the identified relationships is collected by collection engine 201 from a system catalog or data dictionary containing such metadata. In one embodiment, such metadata is accessed using SQL.

In one embodiment, collection engine 201 imports metadata (e.g., columns, views, synonyms, stored procedures, functions, etc.) from data lakehouse 104 concerning the identified relationships using various software tools, including, but not limited to, IBM® Cognos®, CloverDX®, SAP® Bods, etc.

In one embodiment, combination optimization engine 207 converts the enriched table metadata and join relationship metadata into a vector matrix using various vectorizing tools, including, but not limited to, Word2Vec, TF-IDF, etc.

Furthermore, in one embodiment, combination optimization engine 207 designs such a combination optimization algorithm by receiving defined variables and constraints, such as from an expert. For example, the defined variables may define which relationships are to be included in the final join combinations of the relational data of the tables and which tables are to be included in the final join combinations of the relational data of the tables. In a further example, constraints may include which core table is required to be utilized. In another example, constraints may constrain the tables with relationship metadata. In a further example, the constraints may include the constraint to have no nested loop join operations.

Additionally, in one embodiment, combination optimization engine 207 designs such a combination optimization algorithm by receiving optimal objectives, such as from an expert. In one embodiment, such objectives include the count of joined tables (refers to the number of tables to be joined), the average of the join strength (refers to the average of the join strength among the pairs of columns of the tables to be joined), the joined record count (count of rows) as a percentage to the record count in the core table (core table defines the entities and relationships between them) and a percentage of proven relationships (percentage of identified relationships involving pairs of columns of the tables to be joined that can be joined using SQL statements previously generated by the combination optimization algorithm).

In one embodiment, combination optimization engine 207 is configured to create or build and train a model to identify the best join combinations of the relational data of the user-selected tables according to an objective with weighted factors. In one embodiment, the objective is to find the best join combinations of the relational data among the user-selected tables of data lakehouse 104 based on the weighted factors. In one embodiment, the weighted factors include the count of joined tables (refers to the number of tables to be joined), the average of the join strength (refers to the average of the join strength among the pairs of columns of the tables to be joined), the joined record count (count of rows) as a percentage to the record count in the core table (core table defines the entities and relationships between them) and a percentage of proven relationships (percentage of identified relationships involving pairs of columns of the tables to be joined that can be joined using SQL statements previously generated by the combination optimization algorithm). Based on such factors, the weights of which may be user-selected, the combination optimization algorithm identifies the best join combinations of the relational data among the user-selected tables of data lakehouse 104.

In one embodiment, combination optimization engine 207 uses a combination optimization algorithm that corresponds to a machine learning algorithm (e.g., supervised learning) to build the model to identify the best join combinations of the relational data of the user-selected tables using a sample data set containing combinations of relational data of tables that should be selected along with the corresponding weighted factors discussed above.

Such a sample data set is referred to herein as the "training data," which is used by the machine learning algorithm to make predictions or decisions as to the predicted best join combinations of relational data among the tables. The algorithm iteratively makes predictions on the training data as to the best join combinations of relational data among the tables until the predictions achieve the desired accuracy as determined by an expert. Examples of such learning algorithms include nearest neighbor, Naïve Bayes, decision trees, linear regression, support vector machines and neural networks.

In one embodiment, the model generates a score for each of the join combinations of relational data of user-selected tables, where such a score is normalized between 0 and 1. In one embodiment, the higher the score, the higher the ranking in such a join combination of relational data of user-selected tables.

Furthermore, in one embodiment, combination optimization engine 207 generates a list of recommended join combinations of relational data among the user-selected tables based on such scores. For example, such a list may include the join combinations with the top scores. In one embodiment, such recommendations are in terms of SQL statements with join clauses.

Additionally, intelligent join recommendation mechanism 105 includes a feedback engine 208 configured to receive user feedback based on the user's selection of the SQL statements from the recommend join combinations of relational data among the user-selected tables provided by combination optimization engine 207.

Figure 4:
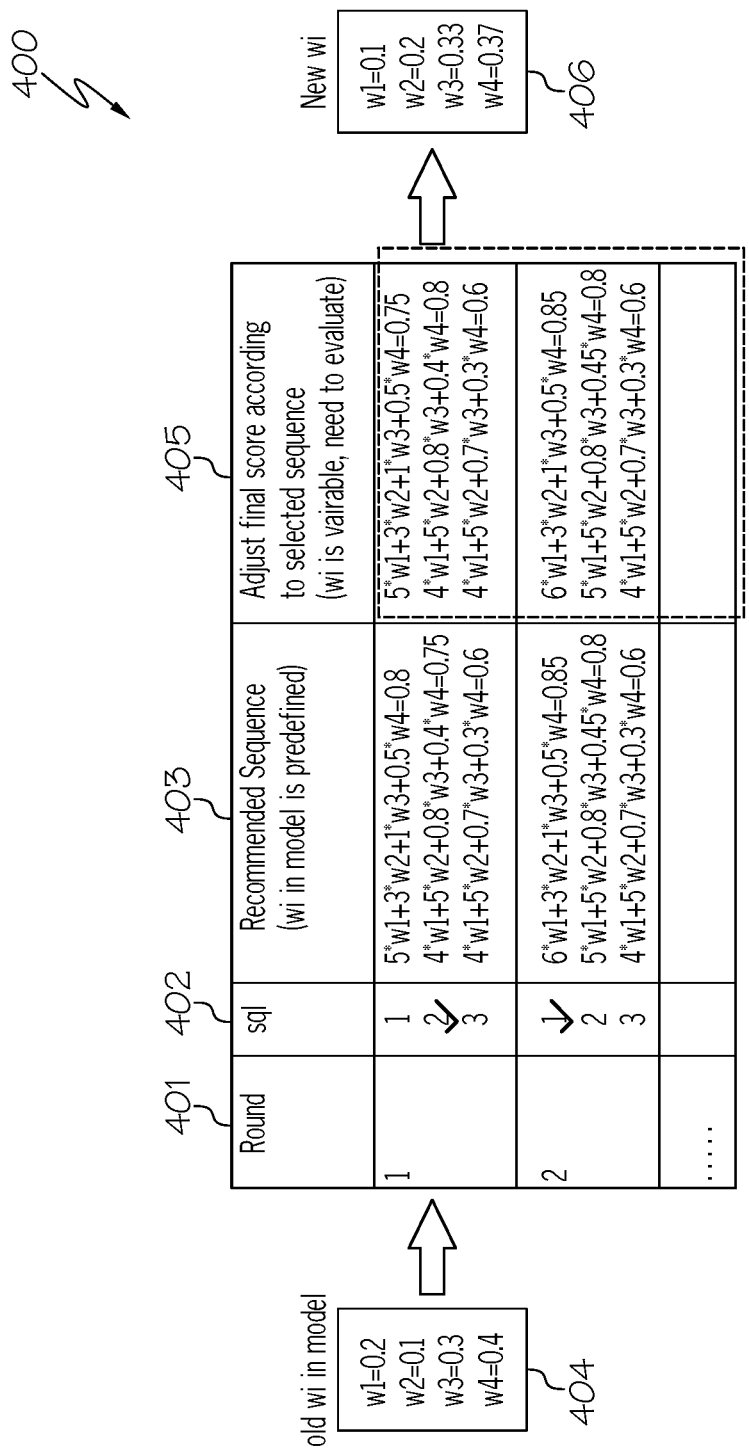
FIG. 4 is a table illustrating adjusting the object weights based on the user's feedback in connection with the user selection of the SQL statements from the recommended join combinations of relational data of the tables of the data lakehouse in accordance with an embodiment of the present disclosure.

Based on such user feedback, feedback engine 208 adjusts the object weights to improve the accuracy of the combination optimization algorithm as shown in FIG. 4.

Referring to FIG. 4, FIG. 4 is a table 400 illustrating adjusting the object weights based on the user's feedback in connection with the user selection of the SQL statements from the recommended join combinations of relational data of the tables of data lakehouse 104 in accordance with an embodiment of the present disclosure.

As shown in FIG. 4, table 400 includes the round 401 in which the recommended join combinations of the relational data of the user-selected tables were issued by combination optimization engine 207. Table 400 additionally includes an identifier 402 of the SQL statement of the recommend join combinations of the relational data among the user-selected tables along with the corresponding recommended sequence 403 (where wi corresponds to the weight assigned for the weight factor identified by i as shown in element 404) and the adjusted final score according to the selected sequence 405 where the weights assigned to the weigh factors are accordingly adjusted (see element 406).

As also shown in FIG. 4, in the first round, the user selected the SQL statement identified with number 2. In the second round, the user selected the SQL statement identified with number 1.

As a result of such selections, the weights assigned to the weight factors (w1, w2, w3 and w4) have been updated to produce a new resulting score. For instance, the resulting score in the first round for the SQL statement identified with number 1 has been adjusted downwardly from 0.8 to 0.75. The resulting score in the first round for the SQL statement identified with number 2 has been adjusted upwardly from 0.75 to 0.80. With respect to the resulting score in the second round for the SQL statements, they all remained the same.

In one embodiment, based on such adjustments to the weights of the factors, the machine learning model discussed above will identify further best join combinations of the relational data among the user-selected tables based on such updated weight factors. As a result, the machine learning model should provide better recommended join combinations of the relational data of the user-selected tables of data lakehouse 104 that are more aligned to the end user's style.

A further description of these and other features is provided below in connection with the discussion of the method for recommending join operations of relational data among tables of a data lakehouse based on an optimization model.

Prior to the discussion of the method for recommending join operations of relational data among tables of a data lakehouse based on an optimization model, a description of the hardware configuration of intelligent join recommendation mechanism 105 (FIG. 1) is provided below in connection with FIG. 5.

Figure 5:
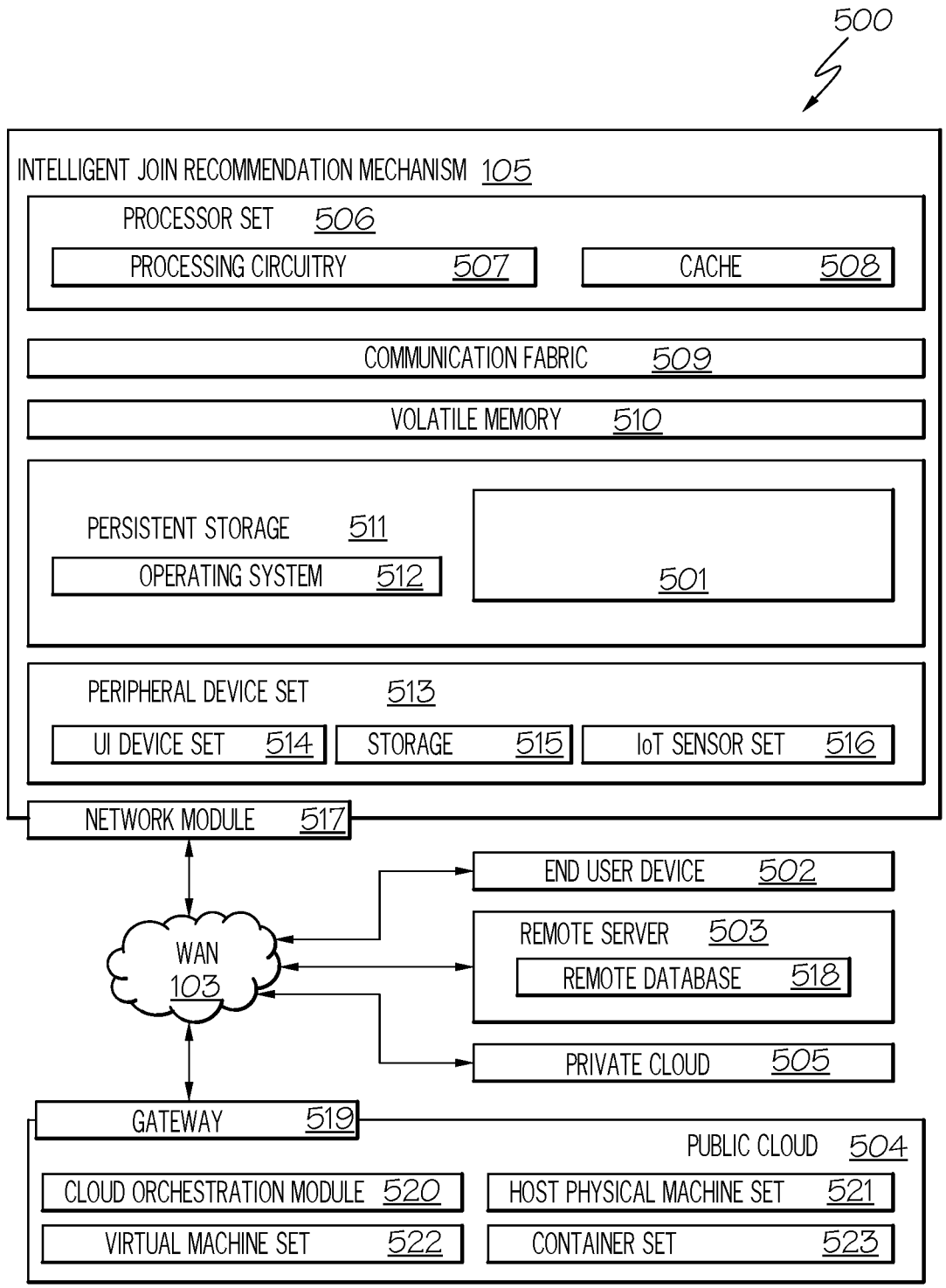
FIG. 5 illustrates an embodiment of the present disclosure of the hardware configuration of the intelligent join recommendation mechanism which is representative of a hardware environment for practicing the present disclosure.

Referring now to FIG. 5, in conjunction with FIG. 1, FIG. 5 illustrates an embodiment of the present disclosure of the hardware configuration of intelligent join recommendation mechanism 105 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code (stored in block 501) involved in performing the inventive methods, such as recommending join operations of relational data among tables of a data lakehouse based on an optimization model. In addition to block 501, computing environment 500 includes, for example, intelligent join recommendation mechanism 105, network 103, such as a wide area network (WAN), end user device (EUD) 502, remote server 503, public cloud 504, and private cloud 505. In this embodiment, intelligent join recommendation mechanism 105 includes processor set 506 (including processing circuitry 507 and cache 508), communication fabric 509, volatile memory 510, persistent storage 511 (including operating system 512 and block 501, as identified above), peripheral device set 513 (including user interface (UI) device set 514, storage 515, and Internet of Things (IoT) sensor set 516), and network module 517. Remote server 503 includes remote database 518. Public cloud 504 includes gateway 519, cloud orchestration module 520, host physical machine set 521, virtual machine set 522, and container set 523.

Intelligent join recommendation mechanism 105 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 518. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically intelligent join recommendation mechanism 105, to keep the presentation as simple as possible. Intelligent join recommendation mechanism 105 may be located in a cloud, even though it is not shown in a cloud in FIG. 5. On the other hand, intelligent join recommendation mechanism 105 is not required to be in a cloud except to any extent as may be affirmatively indicated.

Processor set 506 includes one, or more, computer processors of any type now known or to be developed in the future. Processing circuitry 507 may be distributed over multiple packages, for example, multiple, coordinated integrated circuit chips. Processing circuitry 507 may implement multiple processor threads and/or multiple processor cores. Cache 508 is memory that is located in the processor chip package(s) and is typically used for data or code that should be available for rapid access by the threads or cores running on processor set 506. Cache memories are typically organized into multiple levels depending upon relative proximity to the processing circuitry. Alternatively, some, or all, of the cache for the processor set may be located "off chip." In some computing environments, processor set 506 may be designed for working with qubits and performing quantum computing.

Computer readable program instructions are typically loaded onto intelligent join recommendation mechanism 105 to cause a series of operational steps to be performed by processor set 506 of intelligent join recommendation mechanism 105 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 508 and the other storage media discussed below. The program instructions, and associated data, are accessed by processor set 506 to control and direct performance of the inventive methods. In computing environment 500, at least some of the instructions for performing the inventive methods may be stored in block 501 in persistent storage 511.

Communication fabric 509 is the signal conduction paths that allow the various components of intelligent join recommendation mechanism 105 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 510 is any type of volatile memory now known or to be developed in the future. Examples include dynamic type random access memory (RAM) or static type RAM. Typically, the volatile memory is characterized by random access, but this is not required unless affirmatively indicated. In intelligent join recommendation mechanism 105, the volatile memory 510 is located in a single package and is internal to intelligent join recommendation mechanism 105, but, alternatively or additionally, the volatile memory may be distributed over multiple packages and/or located externally with respect to intelligent join recommendation mechanism 105.

Persistent Storage 511 is any form of non-volatile storage for computers that is now known or to be developed in the future. The non-volatility of this storage means that the stored data is maintained regardless of whether power is being supplied to intelligent join recommendation mechanism 105 and/or directly to persistent storage 511. Persistent storage 511 may be a read only memory (ROM), but typically at least a portion of the persistent storage allows writing of data, deletion of data and re-writing of data. Some familiar forms of persistent storage include magnetic disks and solid state storage devices. Operating system 512 may take several forms, such as various known proprietary operating systems or open source Portable Operating System Interface type operating systems that employ a kernel. The code included in block 501 typically includes at least some of the computer code involved in performing the inventive methods.

Peripheral device set 513 includes the set of peripheral devices of intelligent join recommendation mechanism 105. Data communication connections between the peripheral devices and the other components of intelligent join recommendation mechanism 105 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 514 may include components such as a display screen, speaker, microphone, wearable devices (such as goggles and smart watches), keyboard, mouse, printer, touchpad, game controllers, and haptic devices. Storage 515 is external storage, such as an external hard drive, or insertable storage, such as an SD card. Storage 515 may be persistent and/or volatile. In some embodiments, storage 515 may take the form of a quantum computing storage device for storing data in the form of qubits. In embodiments where intelligent join recommendation mechanism 105 is required to have a large amount of storage (for example, where intelligent join recommendation mechanism 105 locally stores and manages a large database) then this storage may be provided by peripheral storage devices designed for storing very large amounts of data, such as a storage area network (SAN) that is shared by multiple, geographically distributed computers. IoT sensor set 516 is made up of sensors that can be used in Internet of Things applications. For example, one sensor may be a thermometer and another sensor may be a motion detector.

Network module 517 is the collection of computer software, hardware, and firmware that allows intelligent join recommendation mechanism 105 to communicate with other computers through WAN 103. Network module 517 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 517 are performed on the same physical hardware device. In other embodiments (for example, embodiments that utilize software-defined networking (SDN)), the control functions and the forwarding functions of network module 517 are performed on physically separate devices, such that the control functions manage several different network hardware devices. Computer readable program instructions for performing the inventive methods can typically be downloaded to intelligent join recommendation mechanism 105 from an external computer or external storage device through a network adapter card or network interface included in network module 517.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 502 is any computer system that is used and controlled by an end user (for example, a customer of an enterprise that operates intelligent join recommendation mechanism 105), and may take any of the forms discussed above in connection with intelligent join recommendation mechanism 105. EUD 502 typically receives helpful and useful data from the operations of intelligent join recommendation mechanism 105. For example, in a hypothetical case where intelligent join recommendation mechanism 105 is designed to provide a recommendation to an end user, this recommendation would typically be communicated from network module 517 of intelligent join recommendation mechanism 105 through WAN 103 to EUD 502. In this way, EUD 502 can display, or otherwise present, the recommendation to an end user. In some embodiments, EUD 502 may be a client device, such as thin client, heavy client, mainframe computer, desktop computer and so on.

Remote server 503 is any computer system that serves at least some data and/or functionality to intelligent join recommendation mechanism 105. Remote server 503 may be controlled and used by the same entity that operates intelligent join recommendation mechanism 105. Remote server 503 represents the machine(s) that collect and store helpful and useful data for use by other computers, such as intelligent join recommendation mechanism 105. For example, in a hypothetical case where intelligent join recommendation mechanism 105 is designed and programmed to provide a recommendation based on historical data, then this historical data may be provided to intelligent join recommendation mechanism 105 from remote database 518 of remote server 503.

Public cloud 504 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 504 is performed by the computer hardware and/or software of cloud orchestration module 520. The computing resources provided by public cloud 504 are typically implemented by virtual computing environments that run on various computers making up the computers of host physical machine set 521, which is the universe of physical computers in and/or available to public cloud 504. The virtual computing environments (VCEs) typically take the form of virtual machines from virtual machine set 522 and/or containers from container set 523. It is understood that these VCEs may be stored as images and may be transferred among and between the various physical machine hosts, either as images or after instantiation of the VCE. Cloud orchestration module 520 manages the transfer and storage of images, deploys new instantiations of VCEs and manages active instantiations of VCE deployments. Gateway 519 is the collection of computer software, hardware, and firmware that allows public cloud 504 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 505 is similar to public cloud 504, except that the computing resources are only available for use by a single enterprise. While private cloud 505 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 504 and private cloud 505 are both part of a larger hybrid cloud.

Block 501 further includes the software components discussed above in connection with FIGS. 2-4 to recommend join operations of relational data among tables of a data lakehouse based on an optimization model. In one embodiment, such components may be implemented in hardware. The functions discussed above performed by such components are not generic computer functions. As a result, intelligent join recommendation mechanism 105 is a particular machine that is the result of implementing specific, non-generic computer functions.

In one embodiment, the functionality of such software components of intelligent join recommendation mechanism 105, including the functionality for recommending join operations of relational data among tables of a data lakehouse based on an optimization model, may be embodied in an application specific integrated circuit.

As stated above, a data lakehouse is a data platform built from the combination of a data lake and a data warehouse in which data can be easily moved between the low-cost and flexible storage of a data lake over to a data warehouse and vice-versa, providing easy access to a data warehouse's management tools for implementing schema and governance, often powered by machine learning and artificial intelligence for data cleansing. The result creates a data repository that integrates the affordable, unstructured collection of data lakes and the robust preparedness of a data warehouse. A data lakehouse extracts and joins data from various data sources in various formats, such as relational database management system (RDBMS), CSV (comma-separated values), Apache® Parquet, JSON (JavaScript Object Notation), etc. Data lakehouse technology converts such data into tables and columns at a conceptual level so that the user can leverage SQL (Structured Query Language) for querying and extracting data, such as relational data (also referred to as "relational datasets"). Relational data refers to data within the tables that have relationships with one another or dependencies. At times, the relational datasets from such tables need to be joined in a wide table for further analysis. It is a challenge though to identify the most appropriate sub-datasets from the huge and various relational datasets to be joined for further analysis due to the complexity in determining which sub-datasets contain relationships that need to be analyzed, especially when such datasets are in various formats (e.g., CSV, Apache® Parquet, JSON, etc.). Unfortunately, there is not currently a means for effectively identifying the most appropriate sub-datasets from the huge and various relational datasets to be joined for further analysis.

Figure 6A:
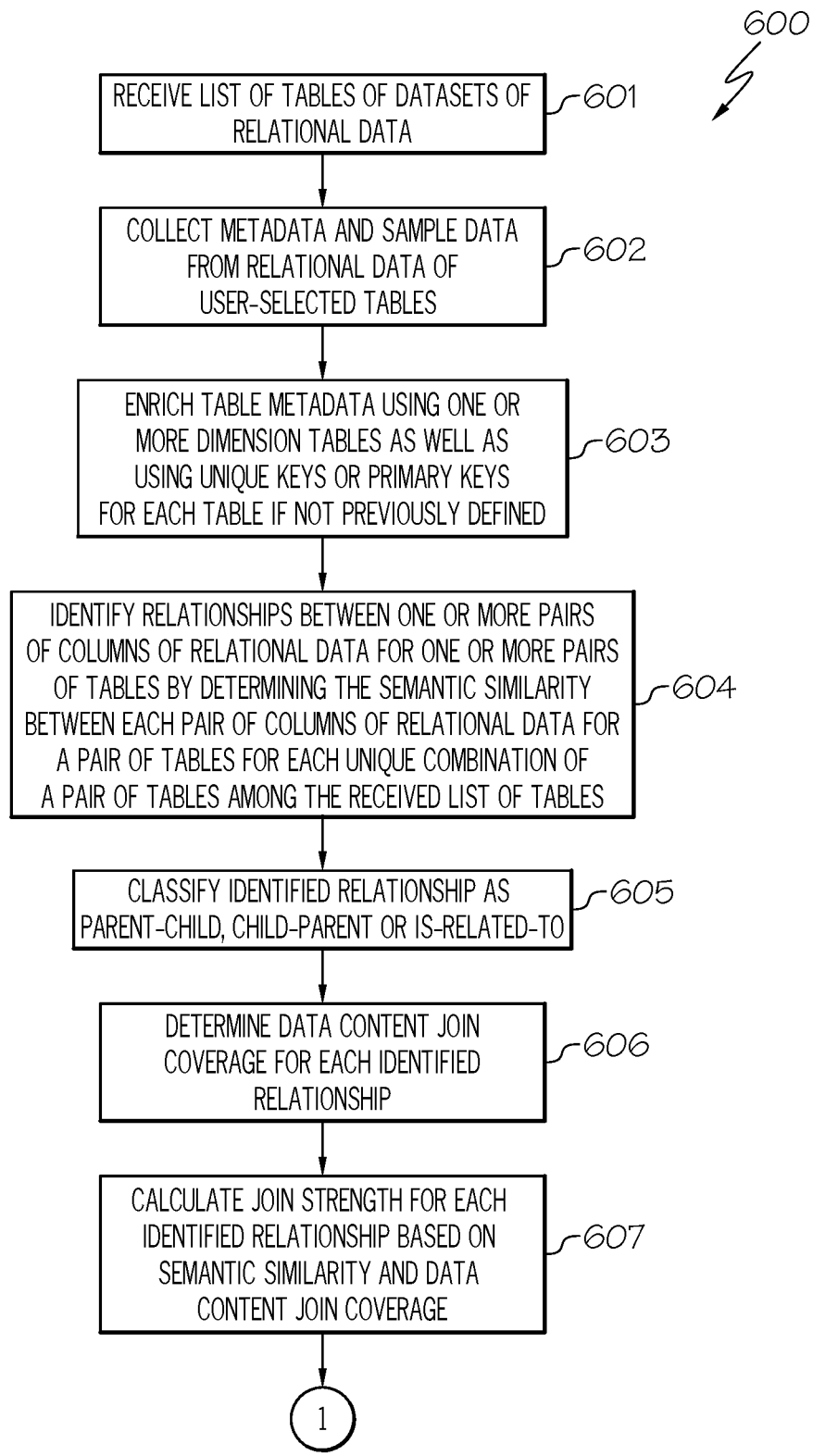
FIGS. 6A-6B are a flowchart of a method for recommending join operations of relational data among different tables in accordance with an embodiment of the present disclosure.
Figure 6B:
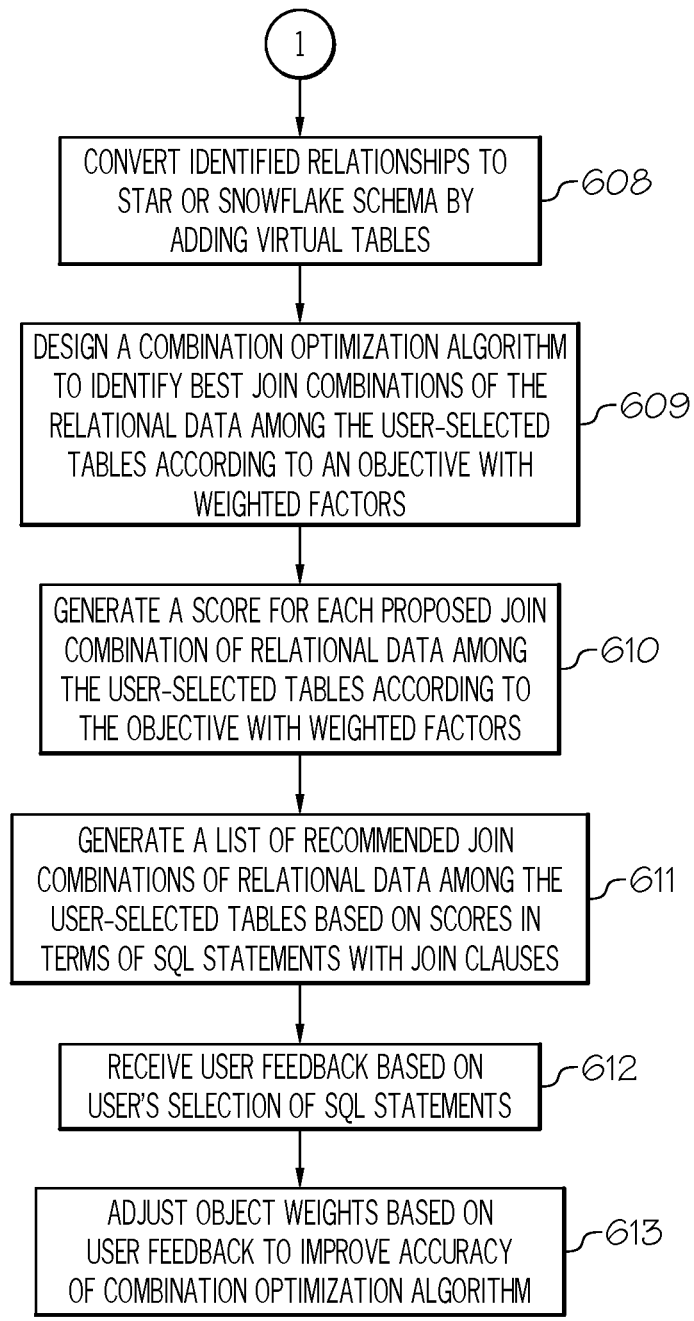
Figure 7:
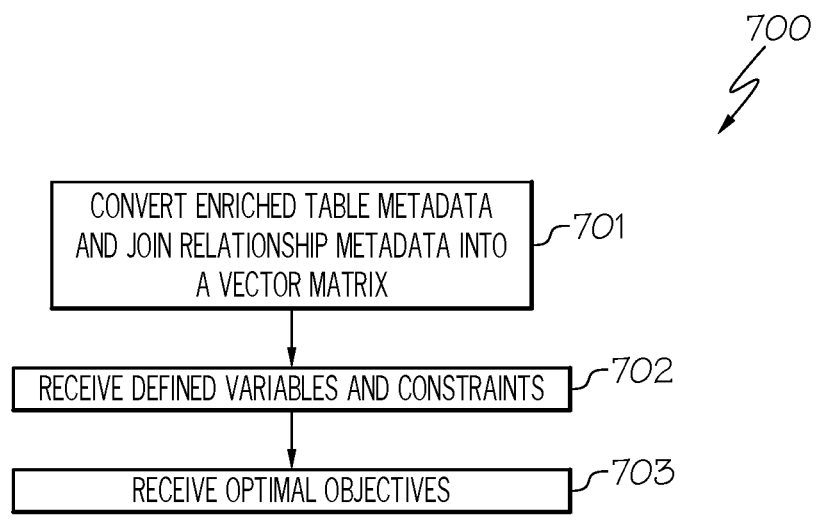
FIG. 7 is a flowchart of a method for designing a combination optimization algorithm to identify the best join combinations of relational data among the tables of the data lakehouse according to an objective with weighted factors in accordance with an embodiment of the present disclosure.

The embodiments of the present disclosure provide a means for effectively identifying the most appropriate relational data to be joined among different tables for further analysis as discussed below in connection with FIGS. 6A-6B and 7. FIGS. 6A-6B are a flowchart of a method for recommending join operations of relational data among different tables. FIG. 7 is a flowchart of a method for designing a combination optimization algorithm to identify the best join combinations of relational data among the tables of the data lakehouse according to an objective with weighted factors.

As stated above, FIGS. 6A-6B are a flowchart of a method 600 for recommending join operations of relational data among different tables in accordance with an embodiment of the present disclosure.

Referring to FIG. 6A, in conjunction with FIGS. 1-5, in step 601, collection engine 201 of intelligent join recommendation mechanism 105 receives a list of tables of datasets of relational data from a user (e.g., user of computing device 101).

As discussed above, in one embodiment, a user (e.g., user of computing device 101) selects a list of tables of datasets of relational data from data lakehouse 104, such as via a SQL editor. Such a selection is received by collection engine 201, such as via an application programming interface. In one embodiment, such a list of tables of datasets of relational data corresponds to the datasets to be intelligently joined by intelligent join recommendation mechanism 105.

Upon receiving such a selected list of tables of datasets of relational data, in step 602, collection engine 201 of intelligent join recommendation mechanism 105 collects the metadata and sample data from the relational data of the user-selected table datasets.

As stated above, in one embodiment, since such table datasets may be stored in various formats (CSV, Apache® Parquet, etc.), collection engine 201 collects such metadata and sample data from various sources. In one embodiment, collection engine 201 collects such metadata and sample data by accessing the information schema system database of data lakehouse 104, which contains database metadata, such as the names of the tables, the column data types, the number of columns, privileges, etc. In one embodiment, collection engine 201 utilizes various software tools for accessing such metadata and sample data from the information schema, including, but not limited to, Navicat®, DbVisualizer, DataGrip®, DBeaver®, TablePlus®, etc.

In one embodiment, the metadata of the relational data of the table datasets is collected by collection engine 201 from a system catalog or data dictionary containing such metadata. In one embodiment, such metadata is accessed using SQL.

In one embodiment, collection engine 201 imports metadata (e.g., columns, views, synonyms, stored procedures, functions, etc.) from data lakehouse 104 concerning the relational data of the tables selected by the user using various software tools, including, but not limited to, IBM® Cognos®, CloverDX®, SAP® Bods, etc. In one embodiment, such particular metadata to be imported from data lakehouse 104 concerning the relational data of the tables selected by the user is determined by an expert.

In one embodiment, collection engine 201 selects various sample data (e.g., column data pertaining to addresses in the customer address table) of the relational data of the tables selected by the user. In one embodiment, such sample data is collected from data lakehouse 104 by collection engine 201 using various software tools, including, but not limited to, IBM® Cognos®, CloverDX®, SAP® Bods, etc. In one embodiment, such sample data to be collected by collection engine 201 is determined by an expert.

In step 603, enrichment engine 202 of intelligent join recommendation mechanism 105 enriches the collected metadata (table metadata) using one or more dimension tables as well as using unique keys or primary keys for each table if not previously defined.

As stated above, "enriched metadata," as used herein, refers to metadata, such as the collected table metadata, which has been increased in quantity and quality with additional metadata. In one embodiment, such additional metadata is obtained from a dimension table(s) as well as the unique key or primary key for each table (each table selected by the user) if not previously defined.

A "dimension table," as used herein, refers to a table or entity in a star, snowflake or starflake schema that stores details about the facts. That is, the dimension table stores attributes or dimensions that describe the objects in a fact table. For example, a time dimension table stores the various aspects of time, such as year, quarter, month, day, etc. In one embodiment, enrichment engine 202 accesses such attributes or dimensions in the dimension table(s) in connection with the tables of datasets of relational data selected by the user using various software tools, including, but not limited to, Amazon® Redshift®, Microsoft® Azure®, PostgreSQL®, etc.

In one embodiment, for tables that were selected by the user that do not include a unique key or primary key definition, enrichment engine 202 generates such unique keys or primary keys. A "unique key," as used herein, refers to a candidate key that is not the primary key of the relation. All the candidate keys of a relation can uniquely identify the records of the relation, but only one of them is used as the "primary key" of the relation. The remaining candidate keys are called unique keys because they can uniquely identify a record in a relation. In one embodiment, unique keys can consist of multiple columns. In one embodiment, the unique keys have a "unique constraint" assigned to it in order to prevent duplicates (a duplicate entry is not valid in a unique column). In one embodiment, enrichment engine 202 creates unique keys for those tables that were selected by the user that do not include a unique key definition by defining the unique constraint(s). In one embodiment, such a unique constraint is defined by enrichment engine 202 by selecting a set of one or more fields/columns of a table that uniquely identify a record in the database table. In one embodiment, such unique constraints are created by enrichment engine 202 using various software tools, such as SQL Server Management Studio or Transact-SQL.

In one embodiment, concerning those tables that were selected by the user that do not include a unique key definition, there may be certain data formats (e.g., CSV, Apache® Parquet) that do not utilize a primary key definition. In such cases, enrichment engine 202 leverages information, such as column data and data type, in order to identify the primary key for such data formats. In one embodiment, such information may be utilized by enrichment engine 202 to generate the primary key using various software tools, such as SQL Server Management Studio or Transact-SQL.

Upon accessing the attributes or dimensions in the dimension table(s) and/or generating unique keys/primary keys, such additional metadata is used by enrichment engine 202 to enrich the collected table metadata in order to increase the collected table metadata in quantity and quality. In one embodiment, enrichment engine 202 enriches the collected table metadata with such additional metadata using various software tools, including, but not limited to, Alation®, InfoSphere®, Infogix®, Informatica®, etc.

In step 604, relationship engine 203 of intelligent join recommendation mechanism 105 identifies the relationships between one or more pairs of columns of relational data for one or more pairs of tables among the list of tables received from the user by determining the semantic similarity between each pair of columns of relational data for a pair of tables for each unique combination of a pair of tables among the received list of tables.

As discussed above, "semantic similarity," as used herein, refers to how similar in meaning is the content of the relational data contained in such pairs of columns. In one embodiment, semantic similarity is determined by relationship engine 203 encoding the relational data contained in such pairs of columns and then calculating the cosine similarity of the resulting two embeddings.

In one embodiment, relationship engine 203 determines the semantic similarity between each pair of columns for a pair of tables for each unique combination of a pair of tables within the set of tables selected by the user using the Jaccard similarity coefficient (or index). For example, for two sets of column data, A and B, the Jaccard index is defined to be the ratio of the size of their intersection and the size of their union: $J(A,B)=(A \cap B)/(A \cup B)$.

In another embodiment, relationship engine 203 determines the semantic similarity between each pair of columns for a pair of tables for each unique combination of a pair of tables within the set of tables selected by the user using the MinHash scheme to estimate $J(A,B)$ quickly without computing the intersection or union. In one embodiment, the following aggregate functions are utilized by relationship engine 203 for estimating the approximate similarity using MinHash: MINHASH (returns a MinHash state containing a MinHash array of length k (input argument), MINHASH COMBINE (combines two (or more) input MinHash states into a single output MinHash state) and APPROXIMATE SIMILARITY (returns an estimation of the similarity (Jaccard index) of input sets based on their MinHash states).

In one embodiment, the semantic similarity between each pair of columns for a pair of tables for each unique combination of a pair of tables within the set of tables selected by the user is determined using the following formula:

WordSimilarity(tbl1,col1,tbl2,col2,['name','description','business term','primarykey'])*DatatypeSimilarity(col1,col2)

where "tbl1" refers to a first table in the pair of tables and "tbl2" refers to the other table in the pair of tables, where "col1" refers to a first column in the pair of columns and "col2" refers to a second column in the pair of columns, where "name, description, business term and primary key" refer to the exemplary enriched metadata and where "DatatypeSimilarity" refers to the similarity in the type of data (description of the kind of data in a table column, such as integer, text, etc.). In one embodiment, the DatatypeSimilarity is computed for the columns, col1, col2, by relationship engine 203 extracting such information from the enriched metadata.

In one embodiment, relationship engine 203 generates a score as a result of calculating the semantic similarity between pairs of columns. In one embodiment the higher the score, the greater the semantic similarity between the pair of columns. In one embodiment, such a score is normalized between 0 and 1. In one embodiment, relationship engine 203 applies a natural language processing algorithm to calculate the semantic similarity which results in a score using word embedding techniques, such as Word2Vec and TF-IDF.

In one embodiment, when a score exceeds a threshold number, which may be user-designated, such a relationship is deemed to be an "identified relationship."

In step 605, relationship engine 203 of intelligent join recommendation mechanism 105 classifies the identified relationships into 2 types, such as "parent-child," "child-parent" or "is-related-to."

As stated above, a "parent-child" or "child-parent" relationship refers to a one-to-one relationship between the pair of columns in which a column's data refers to another column's data in another table. For example, the parent column data may be directed to the data about a subject, such as employees and customers, and the child column data may be directed to the order. If the first column referenced in the identified relationship between the pair of columns is the child, then the relationship is identified as "child-parent." If the first column referenced in the identified relationship between the pair of columns is the parent, then the relationship is identified as "parent-child." A "is-related-to" relationship refers to a one-to many or a many-to-many relationship in which the data in one or more columns is linked to many records or data in other columns. For example, a column data may be directed to a camp counselor which is linked to the records of many campers.

In one embodiment, relationship engine 203 performs such classifications based on the calculated score of the semantic similarity between pairs of columns for the same pairs of tables. In one embodiment, a one-to-one relationship between the pair of columns may result in only a single unique semantic similarity score; whereas, a one-to many or many-to-many relationship between the pair of columns may result in many similar semantic similarity scores.

In step 606, join coverage engine 204 of intelligent join recommendation mechanism 105 determines the data content join converge for each of the identified relationships in connection with joining the tables involved in such identified relationships.

As discussed above, the "data content join coverage," as used herein, indicates a degree of uniqueness of the columns of the relational data of data lakehouse 104. In one embodiment, join coverage engine 204 determines such a data content join coverage based on the unique key count for the column in a pair of columns in the identified relationship versus the total unique key count for the joined tables. In one embodiment, such information (unique key count for the column and unique key count for the joined tables) is obtained from the enriched metadata.

In one embodiment, such data coverage corresponds to two values, where the first value is an indication of the coverage of the first column in the pair of columns of the first table with respect to the joined tables (first and second tables) and the second value is an indication of the coverage of the second column in the pair of columns of the second table with respect to the joined tables (first and second tables). For example, if column 1 of table 1 is being paired with column 2 of table 2, then the data coverage may correspond to two values, such as (0.9, 0.5), where the first value (0.9) indicates the coverage of column 1 of table 1 with respect to the joined tables (tables 1 and 2) and the second value (0.5) indicates the coverage of column 2 of table 2 with respect to the joined tables (tables 1 and 2). In one embodiment, in the example discussed above, the first value may correspond to the unique key count for column 1 of table 1 with respect to the unique key count for the joined tables, tables 1 and 2. The second value may correspond to the unique key count for column 2 of table 2 with respect to the unique key count for the joined tables, tables 1 and 2.

In step 607, join strength engine 205 of intelligent join recommendation mechanism 105 calculates the join strength for each of the identified relationships based on the semantic similarity and the data content join coverage for such identified relationships.

As stated above, a "join strength," as used herein, refers to an indication of the degree that the relational data in the identified relationship match in terms of semantics and coverage. In one embodiment, join strength engine 205 generates a value for the join strength, which may be normalized between 0 and 1. In one embodiment, the higher the value of the join strength, the better that the data in the columns in the pair of tables in the identified relationship match in terms of semantics and coverage and vice-versa. In one embodiment, join strength engine 205 calculates the join strength for each of the identified relationships based on the semantic similarity, the data content join coverage and the classified relationships. For example, the value of the join strength may be calculated using the following formula:

Join Strength=0, if definition of semantic similarity<threshold or join data coverage=0;

Min(0.8+ definition_semantic_similarity*Join_data_coverage, 1), if relation type is "Parent-child";

Min(0.5+ definition_semantic_similarity*Join_data_coverage, 0.8), if relation type is "is-related-to";

Min(0.5,
   definition_semantic_similarity*Join_data_coverage),
   otherwise.

where "definition_semantic_similarity" refers to the value of the calculated semantic similarity for the identified classified relationship and "Join_data_coverage" refers to the value of the data content join coverage for the identified classified relationship.

An example of the calculated join strength and data content join coverage for the various identified relationships is discussed below in connection with FIG. 3.

As shown in FIG. 3, there is a table 300 depicting the type of relationship (see column 301 of table 300) between a pair of columns in a pair of tables (identified as left 302 and right 303). Furthermore, table 300 includes the join strength 304 (identified as "strength") and the data content join coverage 305 (identified as "coverage") for each particular identified relationship. For example, one identified relationship is between the cust_id column 306 of the customer table 307 and the cust_id column 308 of the cust_addr table 309 which corresponds to having a join strength 304 of 1 and a data content join coverage 305 of (0.9, 1) as shown in table 300 of FIG. 3. Furthermore, such an identified relationship is classified as "parent-child" as shown in column 301 of table 300 of FIG. 3.

Furthermore, as shown in FIG. 3, another identified relationship is between the birth_date column 310 of the customer table 307 and the last_active_date column 311 of the cust_addr table 309 which corresponds to having a join strength 304 of 0.02 and a data content join coverage 305 of (0.04, 0.01) as shown in table 300 of FIG. 3. Furthermore, such an identified relationship is classified as "is-related" as shown in column 301 of table 300 of FIG. 3.

As further shown in FIG. 3, another identified relationship is between the birth_date column 310 of the customer table 307 and the date column 312 of the date_dim table 313 which corresponds to having a join strength 304 of 1 and a data content join coverage 305 of (0.5, 0.2) as shown in table 300 of FIG. 3. Furthermore, such an identified relationship is classified as "child-parent" as shown in column 301 of table 300 of FIG. 3.

Additionally, as shown in FIG. 3, a further identified relationship is between the last_active_date column 311 of the cust_addr table 309 and the date column 312 of the date_dim table 313 which corresponds to having a join strength 304 of 1 and a data content join coverage 305 of (1, 0.3) as shown in table 300 of FIG. 3. Furthermore, such an identified relationship is classified as "child-parent" as shown in column 301 of table 300 of FIG. 3.

Upon calculating the join strength for the classified relationships between the pairs of columns of tables to be joined within the set of tables selected by the user, a combination optimization algorithm identifies the best join combinations of relational data (sub-datasets) among the tables of data lakehouse 104 as discussed below.

Referring now to FIG. 6B, in conjunction with FIGS. 1-5, in step 608, conversion engine 206 of intelligent join recommendation mechanism 105 converts the identified the identified relationships to a star or snowflake schema by adding virtual tables.

As discussed above, a "star schema," as used herein, is a multi-dimensional data model used to organize data in a database so that it is easy to understand and analyze. A "snowflake schema," as used herein, refers to a multi-dimensional data model that is an extension of a star schema where dimension tables are broken down into subdimensions. Such schemas are utilized for the logical arrangement of tables in a multidimensional database. The snowflake schema is represented by centralized fact tables which are connected to multiple dimensions. In one embodiment, such fact tables correspond to the virtual tables which are converted from the identified relationships. "Snowflaking" is a method of normalizing the dimension tables in a star schema. When it is completely normalized along all the dimension tables, the resultant structure resembles a snowflake with the fact table in the middle. The principle behind snowflaking is normalization of the dimension tables by removing low cardinality attributes and forming separate tables.

The snowflake schema is similar to the star schema. However, in the snowflake schema, dimensions are normalized into multiple related tables, whereas, the star schema's dimensions are denormalized with each dimension represented by a single table. In one embodiment, such single tables correspond to the virtual tables which are converted from the identified relationships. A complex snowflake shape emerges when the dimensions of a snowflake schema are elaborate, having multiple levels of relationships, and the child tables have multiple parent tables ("forks in the road").

In one embodiment, such virtual tables are created by conversion engine 206 from the information (e.g., join strength 304, data content join coverage 305, classified relationship 301) in table 300 pertaining to the identified relationships via the use of a SQL statement. In one embodiment, conversion engine 206 creates such virtual tables using a SQL console via the CREATE VIRTUAL TABLE statement using SAP®.

In step 609, combination optimization engine 207 of intelligent join recommendation mechanism 105 designs a combination optimization algorithm to identify the best join combinations of the relational data among the user-selected tables according to an objective with weighted factors.

A discussion regarding designing such a combination optimization algorithm is provided below in connection with FIG. 7.

FIG. 7 is a flowchart of a method 700 for designing a combination optimization algorithm to identify the best join combinations of relational data among the tables of the data lakehouse according to an objective with weighted factors in accordance with an embodiment of the present disclosure.

Referring to FIG. 7, in conjunction with FIGS. 1-5 and 6A-6B, in step 701, combination optimization engine 207 of intelligent join recommendation mechanism 105 converts the enriched table metadata and join relationship metadata into a vector matrix.

As discussed above, a "vector matrix," as used herein, refers to a matrix that has only one row or only one column. "Join relationship metadata," as used herein, refers to the metadata pertaining to the identified relationships, such as the table name, column names, primary keys, etc. In one embodiment, such metadata is obtained by collection engine 201 by accessing the information schema system database of data lakehouse 104, which contains database metadata, such as the names of the tables, the column data types, the number of columns, privileges, etc. In one embodiment, collection engine 201 utilizes various software tools for accessing such metadata from the information schema, including, but not limited to, Navicat®, DbVisualizer, DataGrip®, DBeaver®, TablePlus®, etc.

In one embodiment, the metadata of the identified relationships is collected by collection engine 201 from a system catalog or data dictionary containing such metadata. In one embodiment, such metadata is accessed using SQL.

In one embodiment, collection engine 201 imports metadata (e.g., columns, views, synonyms, stored procedures, functions, etc.) from data lakehouse 104 concerning the identified relationships using various software tools, including, but not limited to, IBM® Cognos®, CloverDX®, SAP® Bods, etc.

In one embodiment, combination optimization engine 207 converts the enriched table metadata and join relationship metadata into a vector matrix using various vectorizing tools, including, but not limited to, Word2Vec, TF-IDF, etc.

In step 702, combination optimization engine 207 of intelligent join recommendation mechanism 105 receives defined variables and constraints, such as from an expert. For example, the defined variables may define which relationships are to be included in the final join combinations of the relational data of the tables and which tables are to be included in the final join combinations of the relational data of the tables. In a further example, constraints may include which core table is required to be utilized. In another example, constraints may constrain the tables with relationship metadata. In a further example, the constraints may include the constraint to have no nested loop join operations.

In step 703, combination optimization engine 207 of intelligent join recommendation mechanism 105 receives optimal objectives, such as from an expert.

As discussed above, in one embodiment, such objectives include the count of joined tables (refers to the number of tables to be joined), the average of the join strength (refers to the average of the join strength among the pairs of columns of the tables to be joined), the joined record count (count of rows) as a percentage to the record count in the core table (core table defines the entities and relationships between them) and a percentage of proven relationships (percentage of identified relationships involving pairs of columns of the tables to be joined that can be joined using SQL statements previously generated by the combination optimization algorithm).

In one embodiment, combination optimization engine 207 is configured to create or build and train a model to identify the best join combinations of the relational data of the user-selected tables according to an objective with weighted factors. In one embodiment, the objective is to find the best join combinations of the relational data among the user-selected tables of data lakehouse 104 based on the weighted factors. In one embodiment, the weighted factors include the count of joined tables (refers to the number of tables to be joined), the average of the join strength (refers to the average of the join strength among the pairs of columns of the tables to be joined), the joined record count (count of rows) as a percentage to the record count in the core table (core table defines the entities and relationships between them) and a percentage of proven relationships (percentage of identified relationships involving pairs of columns of the tables to be joined that can be joined using SQL statements previously generated by the combination optimization algorithm). Based on such factors, the weights of which may be user-selected, the combination optimization algorithm identifies the best join combinations of the relational data among the user-selected tables of data lakehouse 104.

In one embodiment, combination optimization engine 207 uses a combination optimization algorithm that corresponds to a machine learning algorithm (e.g., supervised learning) to build the model to identify the best join combinations of the relational data of the user-selected tables using a sample data set containing combinations of relational data of tables that should be selected along with the corresponding weighted factors discussed above.

Such a sample data set is referred to herein as the "training data," which is used by the machine learning algorithm to make predictions or decisions as to the predicted best join combinations of relational data among the tables. The algorithm iteratively makes predictions on the training data as to the best join combinations of relational data among the tables until the predictions achieve the desired accuracy as determined by an expert. Examples of such learning algorithms include nearest neighbor, Naïve Bayes, decision trees, linear regression, support vector machines and neural networks.

Returning to FIG. 6B, in conjunction with FIGS. 1-5 and 7, in step 610, combination optimization engine 207 of intelligent join recommendation mechanism 105 uses the machine learning model to generate a score for each proposed join combination of relational data (sub-datasets) among the tables (tables selected by the user) according to the objective with weighted factors, such as the calculated join strength.

As discussed above, in one embodiment, the model generates a score for each of the join combinations of relational data of user-selected tables, where such a score is normalized between 0 and 1. In one embodiment, the higher the score, the higher the ranking in such a join combination of relational data of user-selected tables.

In step 611, combination optimization engine 207 of intelligent join recommendation mechanism 105 generates a list of recommended join combinations of relational data among the user-selected tables based on the scores of step 610. For example, such a list may include the join combinations with the top scores. In one embodiment, such recommendations are in terms of SQL statements with join clauses.

In step 612, feedback engine 208 of intelligent join recommendation mechanism 105 receives user feedback based on the user's selection of the SQL statements from the recommended join combinations of the relational data among the tables (tables selected by the user) provided by combination optimization engine 207.

In step 613, based on such user feedback, feedback engine 208 of intelligent join recommendation mechanism 105 adjusts the object weights to improve the accuracy of the combination optimization algorithm as shown in FIG. 4.

Referring to FIG. 4, table 400 includes the round 401 in which the recommended join combinations of the relational data of the user-selected tables were issued by combination optimization engine 207. Table 400 additionally includes an identifier 402 of the SQL statement of the recommend join combinations of the relational data among the user-selected tables along with the corresponding recommended sequence 403 (where wi corresponds to the weight assigned for the weight factor identified by i as shown in element 404) and the adjusted final score according to the selected sequence 405 where the weights assigned to the weigh factors are accordingly adjusted (see element 406).

As also shown in FIG. 4, in the first round, the user selected the SQL statement identified with number 2. In the second round, the user selected the SQL statement identified with number 1.

As a result of such selections, the weights assigned to the weight factors (w1, w2, w3 and w4) have been updated to produce a new resulting score. For instance, the resulting score in the first round for the SQL statement identified with number 1 has been adjusted downwardly from 0.8 to 0.75. The resulting score in the first round for the SQL statement identified with number 2 has been adjusted upwardly from 0.75 to 0.80. With respect to the resulting score in the second round for the SQL statements, they all remained the same.

In one embodiment, based on such adjustments to the weights of the factors, the machine learning model discussed above will identify further best join combinations of the relational data among the user-selected tables based on such updated weight factors. As a result, the machine learning model should provide better recommended join combinations of the relational data of the user-selected tables of data lakehouse 104 that are more aligned to the end user's style.

In this manner, the principles of the present disclosure more effectively identify the appropriate relational data to be joined for further analysis based on using the optimization model discussed above.

Furthermore, the principles of the present disclosure improve the technology or technical field involving a data lakehouse. As discussed above, a data lakehouse is a data platform built from the combination of a data lake and a data warehouse in which data can be easily moved between the low-cost and flexible storage of a data lake over to a data warehouse and vice-versa, providing easy access to a data warehouse's management tools for implementing schema and governance, often powered by machine learning and artificial intelligence for data cleansing. The result creates a data repository that integrates the affordable, unstructured collection of data lakes and the robust preparedness of a data warehouse. A data lakehouse extracts and joins data from various data sources in various formats, such as relational database management system (RDBMS), CSV (comma-separated values), Apache® Parquet, JSON (JavaScript Object Notation), etc. Data lakehouse technology converts such data into tables and columns at a conceptual level so that the user can leverage SQL (Structured Query Language) for querying and extracting data, such as relational data (also referred to as "relational datasets"). Relational data refers to data within the tables that have relationships with one another or dependencies. At times, the relational datasets from such tables need to be joined in a wide table for further analysis. It is a challenge though to identify the most appropriate sub-datasets from the huge and various relational datasets to be joined for further analysis due to the complexity in determining which sub-datasets contain relationships that need to be analyzed, especially when such datasets are in various formats (e.g., CSV, Apache® Parquet, JSON, etc.). Unfortunately, there is not currently a means for effectively identifying the most appropriate sub-datasets from the huge and various relational datasets to be joined for further analysis.

Embodiments of the present disclosure improve such technology by identifying relationships between one or more pairs of columns of relational data for one or more pairs of tables by determining the semantic similarity between each pair of columns for each unique combination of tables among the list of tables received from the user. An "identified relationship," as used herein, corresponds to a pair of columns of relational data with a semantic similarity that exceeds a threshold level. The "semantic similarity," as used herein, refers to how similar in meaning is the content of the relational data contained in such pairs of columns. Furthermore, the data content join converge for each of the identified relationships in connection with joining the tables involved in such identified relationships is determined. The "data content join coverage," as used herein, indicates a degree of uniqueness among the pair of columns of the relational data. A join strength is calculated for each of the identified relationships based on the semantic similarity and the data content join coverage for such identified relationships. A "join strength," as used herein, refers to an indication of the degree that the relational data in the identified relationship match in terms of semantics and coverage. Based on the calculated join strength as well as other factors, a combination optimization algorithm identifies the best join combinations of relational data of the tables among a set of tables. The combination optimization algorithm generates a score for each proposed join combination of relational data (sub-datasets) of the tables among a set of tables according to an objective with weighted factors, such as the calculated join strength. A list of recommended join combinations of relational data of the tables among the set of tables is then generated based on the scores in terms of SQL statements with join clauses. User feedback based on the user's selection of SQL statements may be used to adjust the object weights to improve the accuracy of the combination optimization algorithm. In this manner, a more effective means for identifying the most appropriate relational data of the tables to be joined for further analysis is achieved. Furthermore, in this manner, there is an improvement in the technical field involving a data lakehouse.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for recommending join operations of relational data among different tables, the method comprising:

identifying relationships between one or more pairs of columns of relational data for one or more pairs of tables by determining a semantic similarity between each pair of columns of relational data for a pair of tables for each unique combination of a pair of tables of a set of tables of relational data;

determining data content join coverage for each of said identified relationships, wherein said data content join coverage indicates a degree of uniqueness among said pair of columns of relational data;

calculating a join strength for each of said identified relationships based on said semantic similarity and said data content join coverage, wherein said join strength is an indication of a degree that relational data in said identified relationship matches in terms of semantics and coverage;

generating a score for each join combination of relational data of tables of said set of tables according to an objective with weighted factors, wherein said weighted factors comprise said join strength for each of said identified relationships; and generating a list of recommended join combinations of relational data of tables of said set of tables based on said scores.

2. The method as recited in claim 1 further comprising:
receiving a list of said set of tables of relational data;
collecting metadata from said relational data of said set of tables;
enriching said collected metadata using one or more dimension tables; and
determining said semantic similarity between said each pair of columns of relational data for said pair of tables for each unique combination of said pair of tables of said set of tables of relational data using said enriched metadata.

3. The method as recited in claim 2 further comprising:
enriching said collected metadata using one or more of the following in the group consisting of unique keys and primary keys.

4. The method as recited in claim 1 further comprising:
classifying each of said identified relationships, wherein said identified relationships are classified as parent-child, child-parent or is-related-to; and
calculating said join strength for each of said identified relationships based on said semantic similarity, said data content join coverage and said classified relationships.

5. The method as recited in claim 1 further comprising:
receiving user feedback based on user's selection of one or more recommended join combinations; and
adjusting weights of said factors based on said received user feedback.

6. The method as recited in claim 1, wherein said recommended join combinations of relational data of said tables of said set of tables correspond to structured query language statements with join clauses.

7. The method as recited in claim 1 further comprising:
designing a combination optimization algorithm to identify join combinations of relational data of said tables of said set of tables according to said objective with weighted factors, wherein said score is generated for each join combination of relational data of said tables of said set of tables according to said objective with weighted factors using said combination optimization algorithm.

8. A computer program product for recommending join operations of relational data among different tables, the computer program product comprising one or more computer readable storage mediums having program code embodied therewith, the program code comprising programming instructions for:
identifying relationships between one or more pairs of columns of relational data for one or more pairs of tables by determining a semantic similarity between each pair of columns of relational data for a pair of tables for each unique combination of a pair of tables of a set of tables of relational data;
determining data content join coverage for each of said identified relationships, wherein said data content join coverage indicates a degree of uniqueness among said pair of columns of relational data;
calculating a join strength for each of said identified relationships based on said semantic similarity and said data content join coverage, wherein said join strength is an indication of a degree that relational data in said identified relationship matches in terms of semantics and coverage;
generating a score for each join combination of relational data of tables of said set of tables according to an objective with weighted factors, wherein said weighted factors comprise said join strength for each of said identified relationships; and
generating a list of recommended join combinations of relational data of tables of said set of tables based on said scores.

9. The computer program product as recited in claim 8, wherein the program code further comprises the programming instructions for:
receiving a list of said set of tables of relational data;
collecting metadata from said relational data of said set of tables;
enriching said collected metadata using one or more dimension tables; and
determining said semantic similarity between said each pair of columns of relational data for said pair of tables for each unique combination of said pair of tables of said set of tables of relational data using said enriched metadata.

10. The computer program product as recited in claim 9, wherein the program code further comprises the programming instructions for:
enriching said collected metadata using one or more of the following in the group consisting of unique keys and primary keys.

11. The computer program product as recited in claim 8, wherein the program code further comprises the programming instructions for:
classifying each of said identified relationships, wherein said identified relationships are classified as parent-child, child-parent or is-related-to; and
calculating said join strength for each of said identified relationships based on said semantic similarity, said data content join coverage and said classified relationships.

12. The computer program product as recited in claim 8, wherein the program code further comprises the programming instructions for:
receiving user feedback based on user's selection of one or more recommended join combinations; and
adjusting weights of said factors based on said received user feedback.

13. The computer program product as recited in claim 8, wherein said recommended join combinations of relational data of said tables of said set of tables correspond to structured query language statements with join clauses.

14. The computer program product as recited in claim 8, wherein the program code further comprises the programming instructions for:
designing a combination optimization algorithm to identify join combinations of relational data of said tables of said set of tables according to said objective with weighted factors, wherein said score is generated for each join combination of relational data of said tables of said set of tables according to said objective with weighted factors using said combination optimization algorithm.

15. A system, comprising:
a memory for storing a computer program for recommending join operations of relational data among different tables; and
a processor connected to said memory, wherein said processor is configured to execute program instructions of the computer program comprising:

identifying relationships between one or more pairs of columns of relational data for one or more pairs of tables by determining a semantic similarity between each pair of columns of relational data for a pair of tables for each unique combination of a pair of tables of a set of tables of relational data;

determining data content join coverage for each of said identified relationships, wherein said data content join coverage indicates a degree of uniqueness among said pair of columns of relational data;

calculating a join strength for each of said identified relationships based on said semantic similarity and said data content join coverage, wherein said join strength is an indication of a degree that relational data in said identified relationship matches in terms of semantics and coverage;

generating a score for each join combination of relational data of tables of said set of tables according to an objective with weighted factors, wherein said weighted factors comprise said join strength for each of said identified relationships; and generating a list of recommended join combinations of relational data of tables of said set of tables based on said scores.

16. The system as recited in claim 15, wherein the program instructions of the computer program further comprise:

receiving a list of said set of tables of relational data;

collecting metadata from said relational data of said set of tables;

enriching said collected metadata using one or more dimension tables; and determining said semantic similarity between said each pair of columns of relational data for said pair of tables for each unique combination of said pair of tables of said set of tables of relational data using said enriched metadata.

17. The system as recited in claim 16, wherein the program instructions of the computer program further comprise:

enriching said collected metadata using one or more of the following in the group consisting of unique keys and primary keys.

18. The system as recited in claim 15, wherein the program instructions of the computer program further comprise:

classifying each of said identified relationships, wherein said identified relationships are classified as parent-child, child-parent or is-related-to; and calculating said join strength for each of said identified relationships based on said semantic similarity, said data content join coverage and said classified relationships.

19. The system as recited in claim 15, wherein the program instructions of the computer program further comprise:

receiving user feedback based on user's selection of one or more recommended join combinations; and adjusting weights of said factors based on said received user feedback.

20. The system as recited in claim 15, wherein said recommended join combinations of relational data of said tables of said set of tables correspond to structured query language statements with join clauses.

* * * * *